US007219078B2

(12) United States Patent
Lamont et al.

(10) Patent No.: US 7,219,078 B2
(45) Date of Patent: May 15, 2007

(54) SPATIALLY-BASED VALUATION OF PROPERTY

(75) Inventors: Ian G. Lamont, Coleraine (GB); David J. McMullan, Articlave (GB)

(73) Assignee: Causeway Data Communications Limited, Coleraine (GB)

( * ) Notice: Subject to any disclaimer, the term of this patent is extended or adjusted under 35 U.S.C. 154(b) by 701 days.

(21) Appl. No.: 09/947,709

(22) Filed: Sep. 6, 2001

(65) Prior Publication Data

US 2003/0046099 A1    Mar. 6, 2003

(51) Int. Cl.
G06Q 40/00    (2006.01)
(52) U.S. Cl. ............................................. 705/36; 705/1
(58) Field of Classification Search ............ 705/25–40, 705/1
See application file for complete search history.

(56) References Cited

U.S. PATENT DOCUMENTS

| | | | | |
|---|---|---|---|---|
| 4,870,576 A | * | 9/1989 | Tornetta | 705/1 |
| 5,361,201 A | * | 11/1994 | Jost et al. | 705/36 |
| 5,414,621 A | * | 5/1995 | Hough | 705/10 |
| 5,680,305 A | * | 10/1997 | Apgar, IV | 705/36 |
| 5,857,174 A | * | 1/1999 | Dugan | 705/36 |
| 6,038,554 A | * | 3/2000 | Vig | 705/36 |
| 6,058,369 A | * | 5/2000 | Rothstein | 705/36 |
| 6,115,694 A | * | 9/2000 | Cheetham et al. | 705/36 |
| 6,141,648 A | * | 10/2000 | Bonissone et al. | 705/36 |
| 6,401,070 B1 | * | 6/2002 | McManus et al. | 705/36 |

FOREIGN PATENT DOCUMENTS

JP    2001188836 A    *    7/2001

* cited by examiner

Primary Examiner—Frantzy Poinvil
(74) Attorney, Agent, or Firm—Gifford, Krass, Sprinkle, Anderson & Citkowski, P.C.

(57) ABSTRACT

An apparatus and method are described for conducting spatially-based valuation of property, taking into account the values of neighboring properties. The method proceeds by analyzing a database of properties including details of at least the location and value of the known properties, and the location of the property to be valued. Other characteristics of the properties may be included in the database. Similarity scores for each property compared with each other property are calculated, and used to identify those properties with are comparable to the property to be valued. All the comparable properties within a predetermined distance from the property to be valued are used to calculate the unknown property value. The method and apparatus may also generate a report on the property to be valued to a user, which report may further include details of the comparable properties. A computer program for implementing the method is also described.

26 Claims, 9 Drawing Sheets

| | 1 | 2 | 3 | 4 | 5 | 6 | 7 | 8 | 9 |
|---|---|---|---|---|---|---|---|---|---|
| 1 | | .161 | .847 | .915 | .599 | .619 | .655 | .744 | .615 |
| 2 | .161 | | .188 | .113 | .399 | .396 | .452 | .358 | .389 |
| 3 | .847 | .188 | | .917 | .681 | .510 | .552 | .586 | .499 |
| 4 | .915 | .113 | .917 | | .556 | .541 | .638 | .630 | .533 |
| 5 | .599 | .399 | .681 | .556 | | .888 | .759 | .838 | .881 |
| 6 | .619 | .396 | .510 | .541 | .888 | | .927 | .971 | .999 |
| 7 | .655 | .452 | .552 | .638 | .759 | .927 | | .943 | .919 |
| 8 | .744 | .358 | .586 | .630 | .838 | .971 | .943 | | .969 |
| 9 | .615 | .389 | .499 | .533 | .881 | .999 | .919 | .969 | |
| 10 | .780 | .361 | .584 | .647 | .816 | .954 | .932 | .994 | .952 |
| 11 | .715 | .219 | .959 | .815 | .701 | .445 | .418 | .468 | .436 |
| 12 | .613 | .386 | .496 | .530 | .879 | .999 | .917 | .968 | 1.000 |
| 13 | .418 | .460 | .360 | .386 | .852 | .927 | .785 | .819 | .931 |
| 14 | .419 | .448 | .382 | .395 | .863 | .940 | .804 | .837 | .944 |
| 15 | .781 | .356 | .579 | .644 | .812 | .954 | .929 | .994 | .952 |
| 16 | .419 | .448 | .382 | .395 | .863 | .940 | .804 | .837 | .944 |
| 17 | .612 | .395 | .682 | .553 | .993 | .856 | .707 | .804 | .849 |
| 18 | .781 | .356 | .579 | .644 | .812 | .954 | .929 | .994 | .952 |
| 19 | .743 | .351 | .579 | .626 | .831 | .970 | .938 | 1.000 | .969 |
| 20 | .781 | .354 | .577 | .643 | .810 | .953 | .927 | .994 | .952 |
| 21 | .744 | .280 | .794 | .883 | .437 | .518 | .719 | .611 | .510 |
| 22 | .417 | .447 | .378 | .392 | .860 | .938 | .800 | .834 | .942 |
| 23 | .689 | .464 | .662 | .590 | .734 | .550 | .449 | .545 | .539 |
| 24 | .924 | .380 | .744 | .758 | .654 | .634 | .653 | .744 | .624 |
| 25 | .689 | .464 | .662 | .590 | .734 | .550 | .449 | .545 | .539 |
| 26 | .839 | .427 | .533 | .663 | .569 | .676 | .688 | .751 | .670 |

FIG 13

SPATIALLY-BASED VALUATION OF PROPERTY

FIELD OF THE INVENTION

The present invention relates to a method and an apparatus for valuation of property. In particular, but not exclusively, the invention relates to a computer-implemented method and a computer program for providing a spatially-based valuation of property. Certain aspects of the invention relate more specifically to mass appraisal of property values.

BACKGROUND OF THE INVENTION

Property Appraisal is an estimate of value based on opinion, of an adequately described property of a specific age, supported by presentation and analysis of appropriate information. In the case of domestic property an inspection is undertaken whereby a series of criteria are assessed. The combined output of the assessed criteria allow the valuer to produce an appraisal or an estimate of value for the property. In addition, a professional valuer may apply his or her own knowledge about the locality to further refine the assessment.

Mass appraisal, as a method of systematic statistical assessment, requires the same criteria as single appraisals. It therefore follows the same principles as outlined above, the main difference between the two forms of assessment being multiplicity. As with single appraisals, mass appraisal models are primarily judged by two core factors of transparency and predictive accuracy. There are various models or hybrid models and associated modelling techniques currently available; many of these however might perform well in either one of the two factors of transparency and accuracy, but not both. This might be explained by issues such as the sample size, its distribution, the stratification used, the homogeneity of the area or other local environmental factors.

It is commonly accepted that location of a property is the most important factor affecting its value. Significant differences in value can occur over short distances, even within a single street. Property appraisers will infer a substantial amount of information about a property from its location, which ability is based largely on local knowledge and experience. In addition, location itself will exert an influence on nearby properties.

Modelling of property values, therefore, should take into account the significant effect of location on property value. However, due to the difficulties of reproducing local knowledge of appraisers in a model, many valuation models do not directly take into account location when valuing properties, instead making use of 'pseudo-location' signifiers, such as local amenities, accessibility to services, and the like; however, such signifiers do not directly reflect the influence of location, and so can be inaccurate. In addition, such models typically will incorporate many such pseudo-location signifiers in an attempt to minimise the errors inherent in such an approach; this therefore increases computer processing time, and requires detailed assessment of local areas thereby increasing the expense of generating the models.

Other more complex models do attempt to incorporate location as a factor, all of which require an assessment of neighbourhoods or sub-markets. The housing market is a set of distinct but interrelated sub-markets, encompassing dwellings differentiated by one or several alternative dimensions. However, there is little consensus on whether sub-markets should be defined according to property characteristics, or based on the actual house price.

Sub-markets may be defined in a number of ways. In a spatial context, it is possible to create localised regions formed through the aggregation of units such as postal zones, enumeration districts, or ward boundaries. The use of 'political' or other non-property based locational areas creates problems related to boundary positioning; that is, such boundaries have not been drawn up on the basis of property values, and so do not truly reflect the effect of location on property values. Another approach is based on quantitative characteristics of the dwellings, such as house type, size, age, etc.; or house prices may be used to identify sub-markets. These traditional models however assume homogeneity in distribution and thus density over a unit area. Further, no consideration can be given using this type of analytical method to trends which occur across the boundaries of these areal units. Clusters of value which may be higher than average for the whole unit may be 'lost' during analysis. Locational analysis is normally encompassed by either assuming that the locational value is constant, or by sub-dividing units into more readily definable areas such as retail, business or financial districts and assuming each to be constant. In many cases the locational value of these districts may be accounted for through the valuers' expert knowledge of the location.

Although these models do attempt to incorporate the effect of location on property values, the sub-markets thereby defined are often unrepresentative of the actual sub-markets, while no attempt is made to treat the effects of location within a sub-market; that is, the models assume that the effect of location within a sub-market is identical on every property within the sub-market. This can lead to inaccurate valuations, and ignores the possibility of locational trends within a sub-market. In order to go some way towards overcoming these difficulties, conventional models can only rely upon creating smaller and smaller sub-markets, using more and more data, which will clearly increase computer processing time and use more computer memory. In addition, the problem of directly considering the effects of location on property values remains unaddressed.

It is among the objects of embodiments of the invention to provide a valuation model whereby the effects of spatial location on property values may be directly incorporated into the model.

It is further among the objects of certain embodiments of the invention to provide a computer-based modelling method and computer program which may generate property valuations at a lower computer processing burden than conventional valuation models, without sacrificing accuracy.

SUMMARY OF THE INVENTION

In certain embodiments of the invention, these objects are achieved, in part, by making use of statistical techniques to interpolate unknown property values at a particular location from known property values of a particular location. That is, X and Y co-ordinates (or any other location defining variables) of all properties are known, together with values for some of the properties. Statistical techniques may then be used to calculate unknown property values on the basis of their spatial relationship to the known property values. Selected embodiments of the invention may incorporate additional factors into the model to improve accuracy of valuations.

According to a first aspect of the present invention, there is provided a computer-implemented method of spatially-based valuation of a subject property, the method comprising the steps of:

selecting a subset of properties for comparison from a computer database containing characteristics of a plurality of properties of known value, the characteristics including at least a location and a value of each property, and the database further containing characteristics of a subject property of known location;

generating an index of similarity matrix of the subset of properties;

identifying spatially proximate comparable properties to the subject property, by means of a distance factor and an index of similarity threshold; and calculating the value of the subject property based on the values of the identified spatially proximate comparable properties.

Thus, the present invention allows the calculation of a property value based on its spatial location with respect to the identified comparable properties.

The term 'index of similarity matrix', as used herein, refers to a table or other data structure indicating the overall degree of similarity between each property and every other property for a selected dataset as a correlation coefficient for each pair of properties, the coefficient being derived from all selected attributes of the properties. Note that the usage herein differs from the known statistical 'index of similarity' function, with the term as used herein referring to the scoring range from the correlation.

The term 'spatially proximate' as used herein refers to properties which lie within a predetermined distance threshold or factor from a particular property.

Preferably the calculation of the value of the subject property may be weighted with regard to the proximity of the comparable properties. That is, the value of properties which are immediately adjacent the subject property are likely to have a larger effect on the value of the subject property than properties farther away. Weighting of the calculated value accordingly may thus be used to account for location of a property in a manner which varies continuously throughout the area chosen, rather than treating the area as a single, homogenous region.

There may of course be a plurality of subject properties included in the database. The step of subset selection may then also include the step of selecting a particular subject property or properties.

The calculation of the value of the subject property may make use of an interpolation technique; that is, a technique which interpolates the value of unknown points from the value of known points. Most preferably, the calculation makes use of Kriging interpolation (also known simply as 'Kriging'); the skilled person will be aware of techniques for performing Kriging. In general, Kriging may be used to calibrate the method and/or to refine a calculated value, while the basic calculation of the value will be made using the index of similarity matrix of comparable properties, as described above. Alternative calculation techniques may be used if desired; however, it is believed at present that Kriging offers the best method for calculating the value in terms of computational burden and accuracy of calculated values. For example, spline or inverse distance weighted interpolation functions may be used.

Preferably the location of the properties is recorded within the database as X and Y co-ordinates. This is a convenient format to use, and may use for example, national grid mapping references or latitude and longitude measurements as X and Y co-ordinates. Conversion of latitude and longitude measurements from sexagesimal into a more convenient format (for example, decimal representation) may be used. Other location formats may also be used, for example, polar co-ordinates.

The value of the properties may be represented as absolute price, relative price, or price per square meter or square foot.

Preferably the database includes characteristics of the properties in addition to location and value. Ideally, these characteristics will be those which are believed to have an effect on the value of a property; for example, age of building, type of building, size, number of bathrooms, central heating, garage, and so forth. Additional characteristics which do not affect property value may also be included, if desired.

Selection of the subset of properties may be carried out automatically, for example by a computing device according to predetermined characteristics (such as within a predefined area), or manually by an operator. Where a manual selection is made, this may be by area (such as a town, or a district), or by non-spatial characteristics (for example, all detached houses), or by a combination of spatial and non-spatial characteristics. Reference herein to 'a subset' of properties may of course be taken to include selection of all properties on the database.

The database may be local to the computer implementing the present method, or may be remote therefrom and accessed by for example a telecommunications network.

The step of generating the index of similarity matrix comprises calculating a similarity score for each property (both of known and unknown value) when compared with every other property within the subset. The similarity score preferably is given as a correlation coefficient for the set of characteristics of each property; conventional statistical techniques may be used to calculate this correlation coefficient. The index of similarity matrix may be calculated using all characteristics included within the database, or only a subset thereof. If a subset of characteristics is used, the method may further comprise the step of selecting the characteristics to be compared.

Where characteristics to be compared include non-numerically coded characteristics (for example, 'house type' may be coded as 'bungalow', 'detached', 'terrace', and so forth), the method may comprise the further step of automatically recoding non-numerical characteristics into numerical characteristics (for example, 'house type' may be recoded as 1, 2, 3, etc.). This allows such characteristics to be included within the index of similarity matrix. The numerical codes assigned may be arbitrary, provided that like properties will be assigned the same numerical code.

Generation of the matrix preferably further comprises the step of standardising characteristics to be compared, such that each characteristic may be meaningfully compared with each other characteristic. For example, while the value of a property may range from, say, $10,000 to $100,000, the number of bedrooms may range only from 1 to 5. Standardisation of these characteristics allows meaningful comparisons to be made. The calculated index of similarity may further be normalised, to provide a similarity score of between 0 and 1 for each property.

During the identification of spatially proximate comparable properties step, the distance factor and index of similarity threshold may be manually set by an operator, or may be predetermined by a computer implementing the method. Alternatively, the method may further comprise the step of calculating optimal values for either or both of these values based on the database. For example, the optimal distance factor for accurate valuation of properties will vary depending on the precise contents of the database; the method may thus calculate this optimal factor based on the data to be used. The optimal distance factor may, for example, be generated by a semi-variogram model with the range determining the distance of influence (spatial auto-correlation). The index of similarity threshold value may be generated by, for example, selecting values in the top percentile from the similarity matrix. The optimal value may be used automatically, or may be simply suggested to an operator.

The method may further comprise the step of displaying the location of properties and/or other characteristics on a display. The display may further comprise a map of a relevant area; for example, a town street map may be overlaid with the location of each property in the database.

The method may further comprise the step of reporting the calculated value of the subject property to an operator. A report may be given by any convenient output device; for example, on a display monitor, via a printer, by generated speech, by SMS or other messaging service transmitted over a telecommunications network, and so forth. The method may yet further comprise the step of reporting to an operator additional details of the calculation: for example, details of the identified comparable properties may be given, or an estimated reliability rating. This allows an operator to determine on what basis the valuation has been made, so rendering the method relatively transparent to a user.

The method may further comprise the step of calculating a reliability rating for calculated value of a subject property. Conventional statistical techniques may be used to provide a reliability rating based on the database used.

The method may yet further comprise the step of removing properties with statistically outlying characteristics from the subset of properties. For example, if a database includes details of one particular property which sold for a significant amount above or below its actual value, then this outlier may skew the calculated values of subject properties. Removal of such properties improves the accuracy of the method. Outliers may be identified automatically, or manually. Certain embodiments of the invention may allow for outliers to have their characteristics edited and returned to the subset of properties, rather than simply removed; for example, if a user identifies an outlier due to an incorrectly-entered value, they may edit the value to correct it rather than excluding the property from the database altogether.

According to a second aspect of the present invention, there is provided a computer program product for spatially-based valuation of a subject property comprising computer program code recorded on a data carrier, the computer program code comprising:

code for allowing the selection of a subset of properties for comparison from a computer database containing characteristics of a plurality of properties of known value, the characteristics including at least a location and a value of each property, and the database further containing characteristics of a subject property of known location;

code for generating an index of similarity matrix of the subset of properties;

code for identifying spatially proximate comparable properties to the subject property, by means of a distance factor and an index of similarity threshold; and code for calculating the value of the subject property based on the values of the identified spatially proximate comparable properties.

The data carrier may be in the form of magnetic tape, optical discs such as CD-ROMs, magnetic media such as floppy discs or hard discs, or permanent data carriers such as ROM chips and the like. The data carrier may still further comprise optical or electrical signal carriers such as optical fibres or communications cables.

The computer program product may further comprise code for removal of outliers from the subset of properties.

The computer program product may further comprise code for recording calculated property values in a database.

According to a still further aspect of the present invention, there is provided a computer program for spatially-based valuation of a subject property, the computer program comprising:

code for allowing the selection of a subset of properties for comparison from a computer database containing characteristics of a plurality of properties of known value, the characteristics including at least a location and a value of each property, and the database further containing characteristics of a subject property of known location;

code for generating an index of similarity matrix of the subset of properties;

code for identifying spatially proximate comparable properties to the subject property, by means of a distance factor and an index of similarity threshold; and code for calculating the value of the subject property based on the values of the identified spatially proximate comparable properties.

According to a still further aspect of the present invention, there is provided a computer system for spatially-based valuation of a subject property, the system comprising:

means for selecting a subset of properties for comparison from a computer database containing characteristics of a plurality of properties of known value, the characteristics including at least a location and a value of each property, and the database further containing characteristics of a subject property of known location;

means for generating an index of similarity matrix of the subset of properties;

means for identifying spatially proximate comparable properties to the subject property, by means of a distance factor and an index of similarity threshold; and means for calculating the value of the subject property based on the values of the identified spatially proximate comparable properties.

The system may further comprise means for remotely accessing said computer database.

The system may still further comprise means for generating a report of the value of the subject property to a user. The report generation means may comprise a display means, such as a computer monitor or the like, printing means, sound generating means, or means for accessing a remote communications network, for example the internet, a telecommunications network, or the like.

According to a yet further aspect of the present invention, there is provided a method of spatially-based valuation of a subject property, the method comprising the steps of:

selecting a subset of properties for comparison from a database containing characteristics of a plurality of properties of known value, the characteristics including at least a location and a value of each property, and the database further containing characteristics of a subject property of known location;

generating an index of similarity matrix of the subset of properties;

identifying spatially proximate comparable properties to the subject property, by means of a distance factor and an index of similarity threshold; and calculating the value of the subject property based on the values of the identified spatially proximate comparable properties.

According to a yet further aspect of the present invention, there is provided a method of providing a spatially-based property valuation to a customer, the method comprising the steps of:

selecting a subset of properties for comparison from a computer database containing characteristics of a plurality of properties of known value, the characteristics including at least a location and a value of each property, and the database further containing characteristics of a subject property of known location;

generating an index of similarity matrix of the subset of properties;

identifying spatially proximate comparable properties to the subject property, by means of a distance factor and an index of similarity threshold;

calculating the value of the subject property based on the values of the identified spatially proximate comparable properties;

providing a report containing the calculated value of the subject property to a customer; and charging the customer in return for providing the report.

The report may be provided by any convenient means, for example, on paper, by email or other communications network, on a computer or other display screen, verbally, via a personal digital assistant (PDA) or other portable electronic device, or the like.

The subset of properties may be selected automatically in response to a query from a customer, or may be manually selected.

The method may further comprise the steps of allowing the customer to select the subject property, and performing the remainder of the steps of the method without operator or customer intervention. This allows the method to be implemented for example via the internet or the like, by which a customer may enter details of a subject property and receive by return a valuation report.

The report may be of varying levels of detail; the method may further comprise the step of allowing the customer to select the desired level of detail, and charging the customer dependent on their selected level of detail.

Where the method involves customer interaction, the customer may interact in any convenient manner; for example with a property valuer, via the internet, by means of a mobile communications device, such as a mobile telephone or personal digital assistant (PDA), or the like. The use of mobile interactions allows the method to be used as an 'impulse' buy; for example, if a customer passes a property which they like, they may immediately obtain a valuation to determine whether or not the property would be affordable.

Charging of the customer may take place at the time of obtaining the report, or at a different time. For example, corporate customers may wish to pay a subscription to access the system, rather than pay for each use. The customer may be charged by debiting a credit or charge card, by deducting funds directly from a bank account, by deducting an amount of 'electronic cash' from a smart card or 'electronic wallet' or similar device, by issuing an invoice, or by any other suitable means. Where the customer accesses the service by means of a telephone call or the like, the charge may be incorporated into the cost of the call; for example, the customer may access the service via a mobile telephone by dialling a 'premium-rate' telephone number.

According to a still further aspect of the present invention, there is provided a method of providing a spatially-based valuation of a subject property, the method comprising the steps of:

accessing a remote computer database containing characteristics of a plurality of properties of known value, the characteristics including at least a location and a value of each property, and the database further containing characteristics of a subject property of known location;

selecting a subset of properties for comparison from the database;

generating an index of similarity matrix of the subset of properties;

identifying spatially proximate comparable properties to the subject property, by means of a distance factor and an index of similarity threshold; and calculating the value of the subject property based on the values of the identified spatially proximate comparable properties.

According to a yet further aspect of the present invention, there is provided a method of providing a spatially-based valuation of a subject property, the method comprising the steps of:

allowing a user to select a subset of properties for comparison from a remote computer database containing characteristics of a plurality of properties of known value, the characteristics including at least a location and a value of each property, and the database further containing characteristics of a subject property of known location;

generating an index of similarity matrix of the subset of properties;

identifying spatially proximate comparable properties to the subject property, by means of a distance factor and an index of similarity threshold;

calculating the value of the subject property based on the values of the identified spatially proximate comparable properties; and providing the calculated value to the user.

The calculated value may be provided to the user over a remote communications link; for example, the internet or the like.

BRIEF DESCRIPTION OF THE DRAWINGS

The best mode known of performing the invention at the present time will now be described in more detail, by way of example only, with reference to the accompanying drawings, in which:

FIGS. 5 to 13 are screen shots of various steps in a computer implementation of the processes of FIGS. 1 to 3.

DETAILED DESCRIPTION OF THE DRAWINGS

Figure 1:
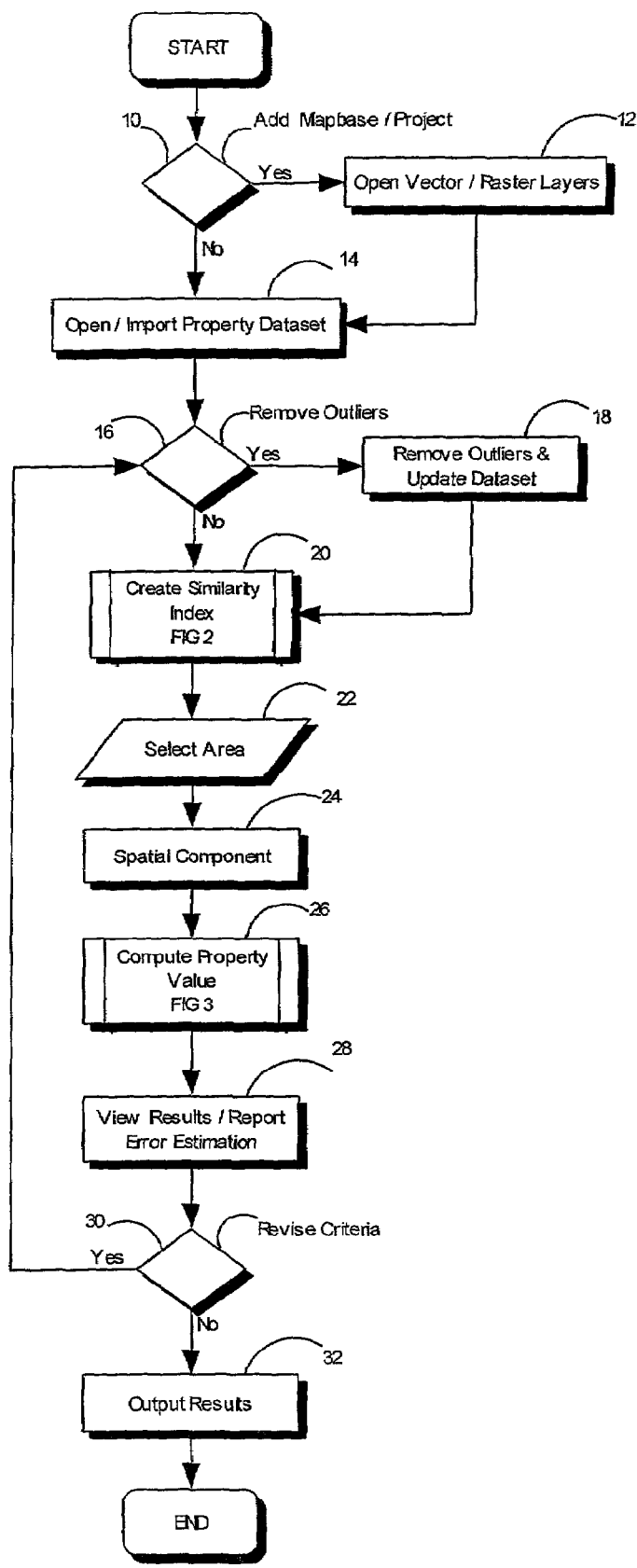
FIG. 1 is a flow chart describing the steps of determining a property value estimate of unsold properties within a specified area.

Referring first of all to FIG. 1, this shows a flow chart of the steps of the method of valuation of a subject property in accordance with one embodiment of the invention. The method will typically be implemented on a computing device such as a personal computer (PC).

The method begins at step 10, which offers the user the option of adding a mapbase to the current valuation cycle. A mapbase may be added, at step 12, as a vector or raster dataset, and allows a map of the relevant area (town, county, district, and so forth) to be displayed on the computer screen during the valuation process, thereby allowing a user to locate each property on the map.

Figure 5:
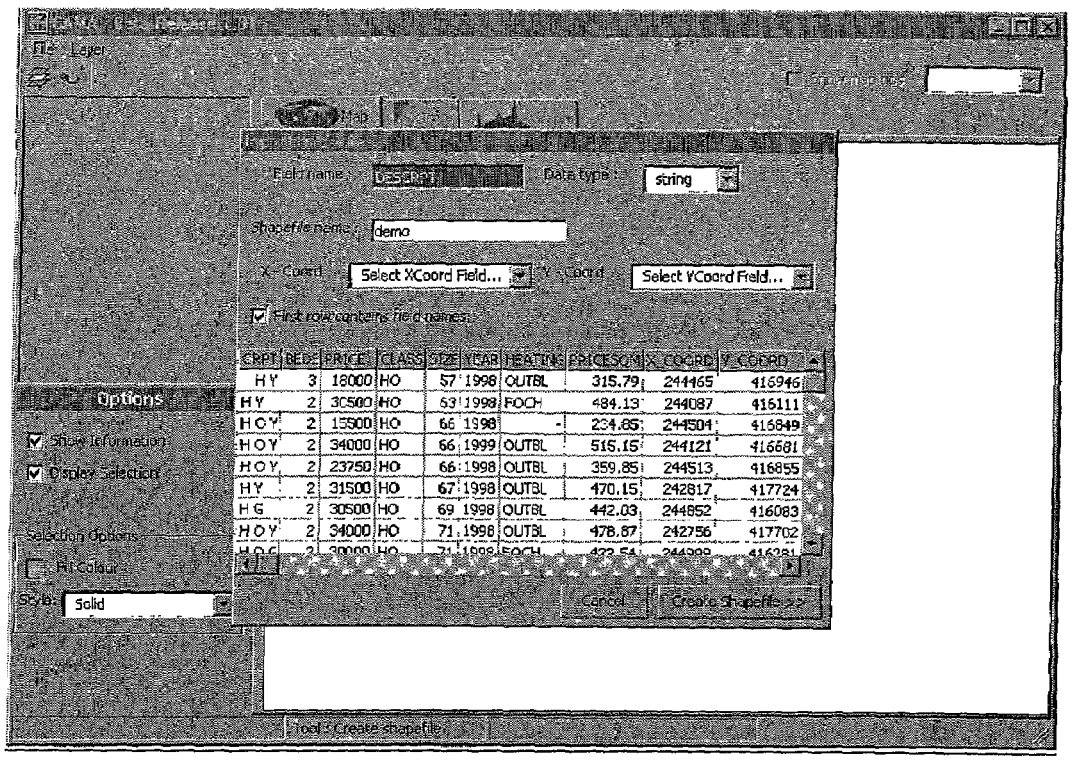

After this step, or if no mapbase is to be added, the relevant property database is opened, at step 14. An extract of a sample database is shown in FIG. 5. The database used must contain location and value data for each known property, although it may contain additional information on each property to allow more accurate comparisons to be made. For example, in addition to location and price information (X_COORD, Y_COORD, and PRICESQM), the extract shown in FIG. 5 includes among other things details of the number of bedrooms in the property (BEDS), the size in square meters, the year the valuation was obtained, and the type of heating provided. Although the illustrated extract gives the location variables in the form of X and Y grid references for each property, alternative location systems may be used, such as zip codes, latitude and longitude co-ordinates, and suchlike. Examples of other information which may be included in the database are, among other variables, details of the age of the property (in age bands, coded as 1, 2, 3, etc), and the type of property (coded as TER, terraced, APC, apartment, SDT, semi-detached, and so forth). The database will also, of course, include details of subject properties of unknown value.

The computer program may automatically open a local database associated with the program, or may offer a user the option to select which of a number of databases to be used. Alternatively, the program may be used in association with a remote database which the user may select.

Figure 6:
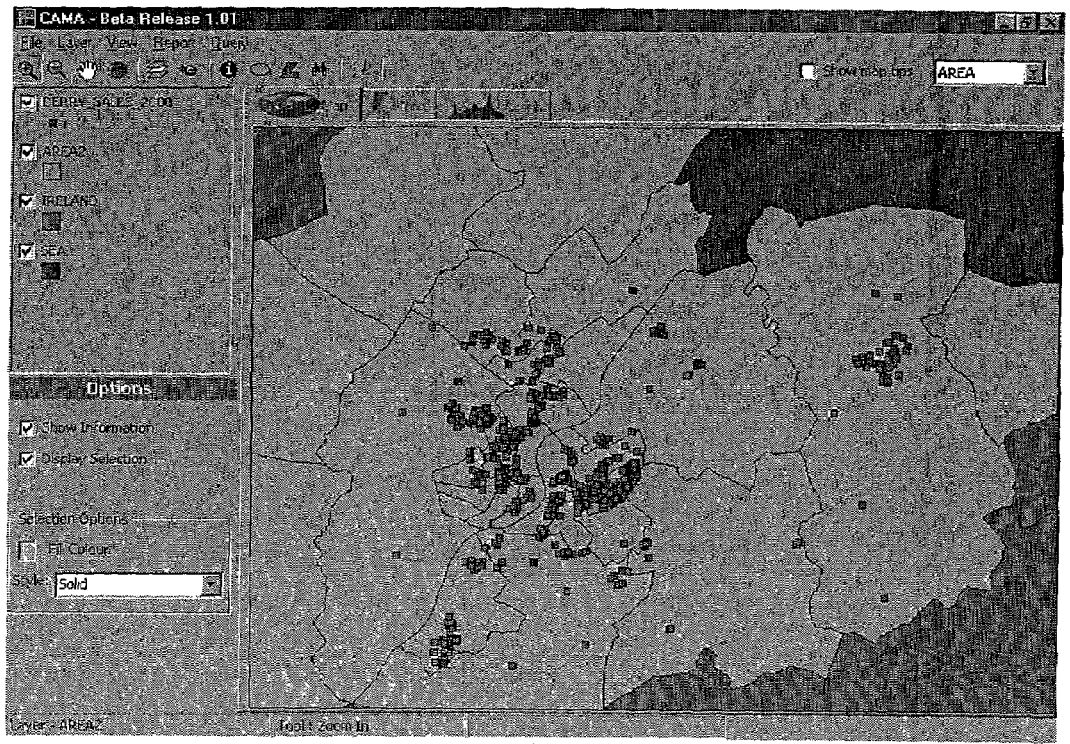

Once the database is opened, each property is plotted on the mapbase, as illustrated in FIG. 6, allowing the user to see at a glance where each property from the database is located. Although a simple mapbase has been used in this example, showing administrative boundaries only, more detailed maps may be used, showing for example accurate geographical information, or street maps.

Figure 7:
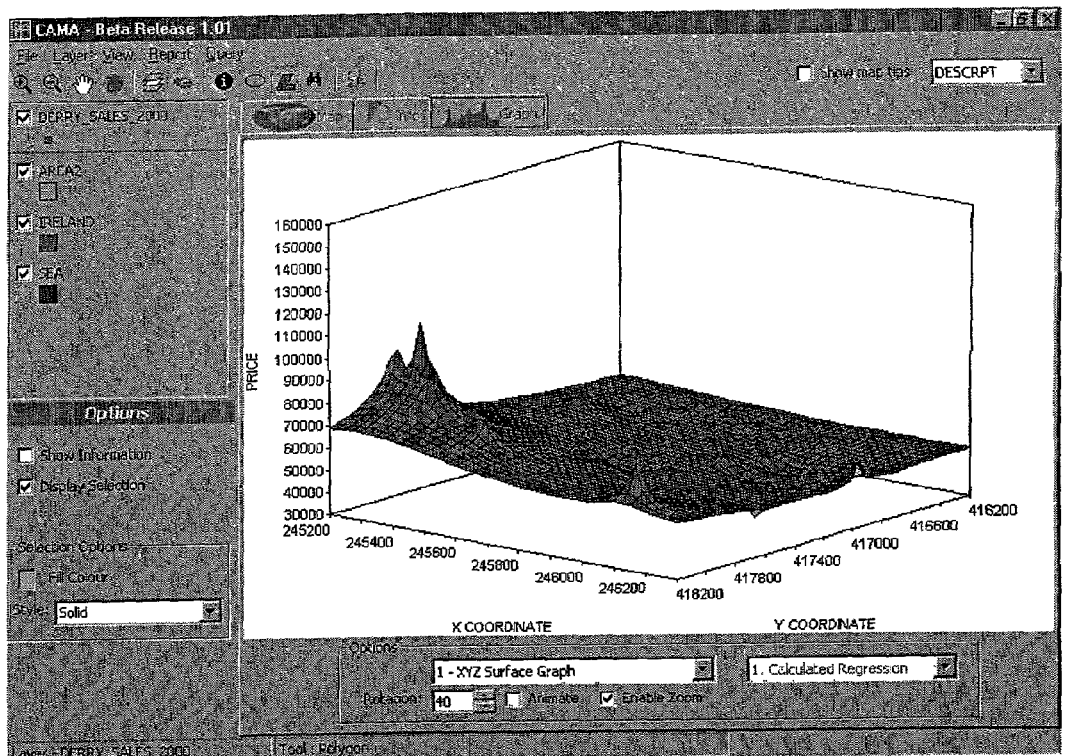
Figure 8:
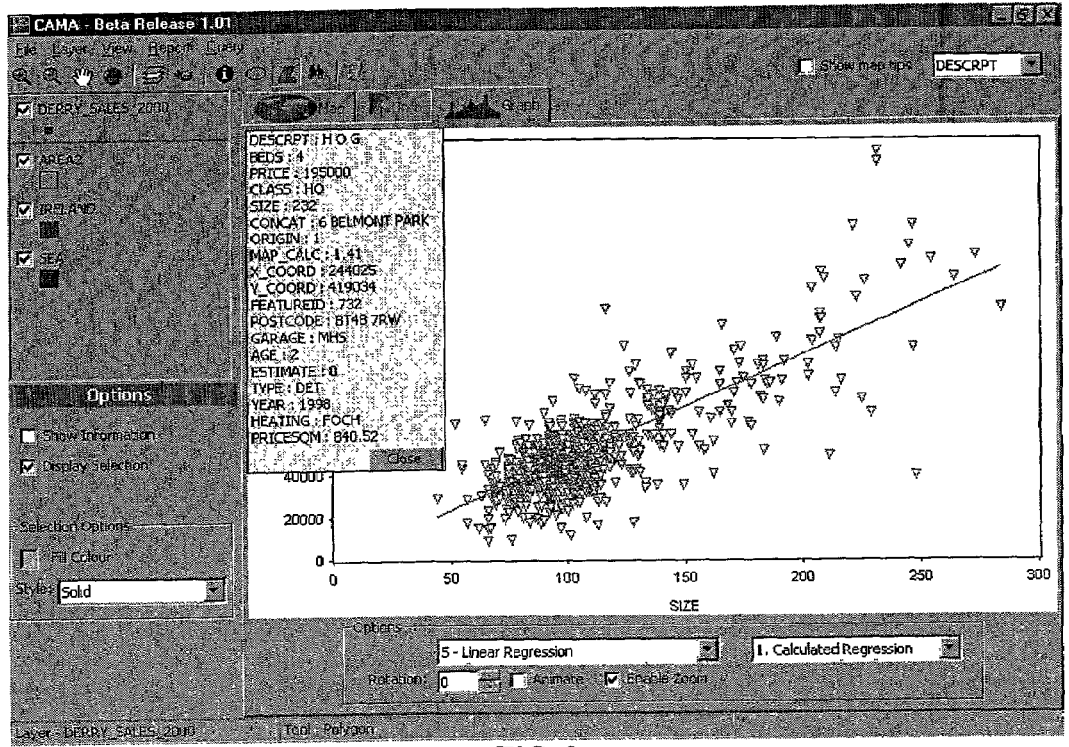

Once the property database has been added, the user is given the opportunity at step 16 to remove any outliers from the database at step 18. Removal of anomalous data points can improve the accuracy of valuations made. To assist the user in identifying outliers, selected variables from the database may be plotted graphically, as shown in FIGS. 7 and 8. FIG. 7 shows location plotted against price of property, while FIG. 8 shows price of property plotted against size. FIG. 8 also illustrates the addition of a line of best fit to the graph, to assist in identification of outliers, and the display of all data recorded for a selected property, which allows a user to review the property attributes. One or more selected properties may then be removed from the dataset for the current valuation process. Alternatively, the anomalous variables may be edited by the user, if an error in the data is apparent.

Figure 2:
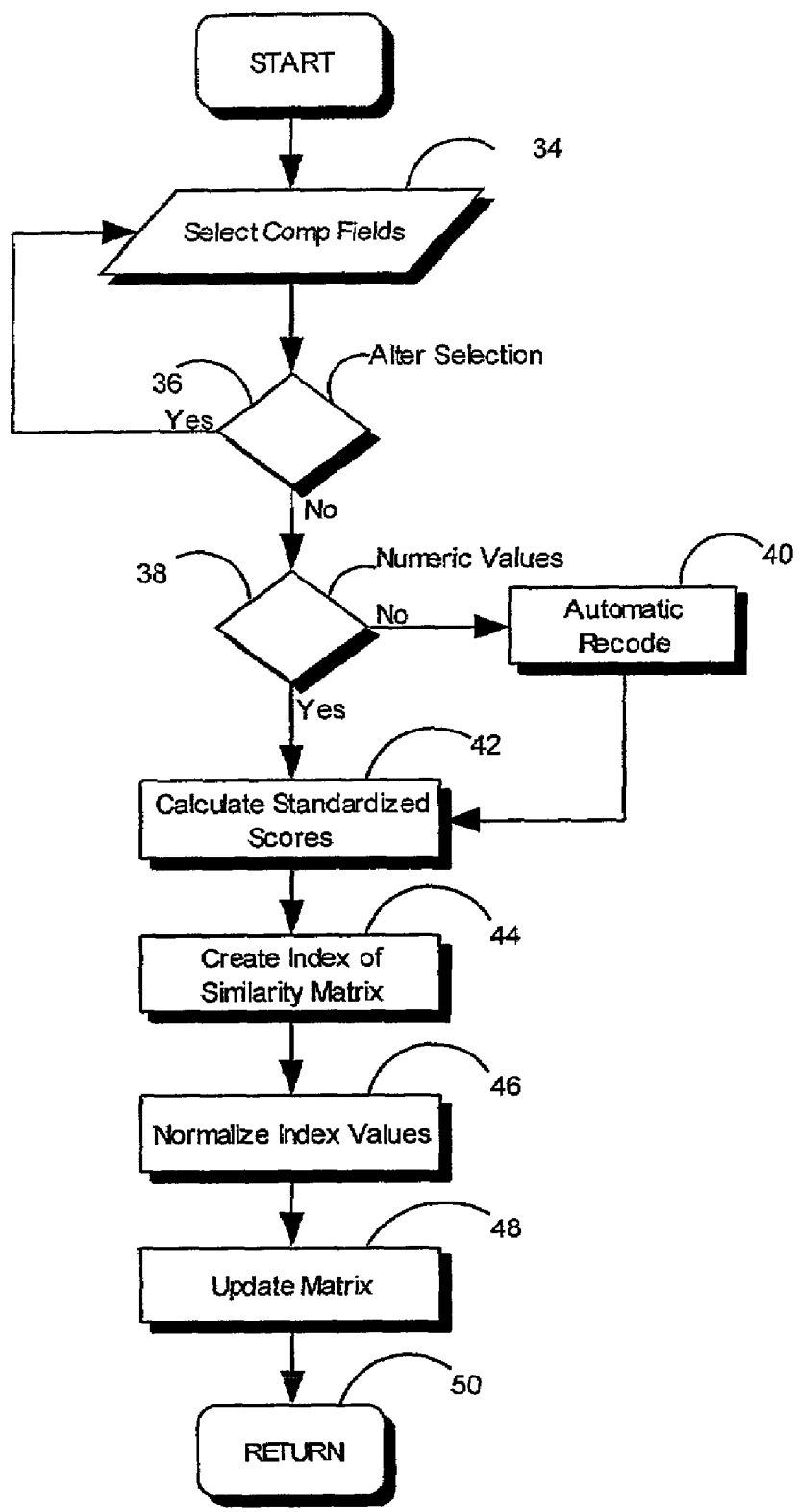
FIG. 2 is a flow chart describing the steps involved in generating an index of similarity matrix.

Once outliers have been removed, the dataset is ready for modelling. An 'index of similarity matrix' is generated at step 20 from the data; this process will now be described in detail with reference to FIG. 2. The remainder of FIG. 1 will then be described subsequently.

An index of similarity matrix, as the term is used herein, refers to a table or other data structure indicating the overall degree of similarity between each property and every other property for a selected dataset as a correlation coefficient for each pair of properties, the coefficient being derived from all selected attributes of the properties.

Figures 9, 10:
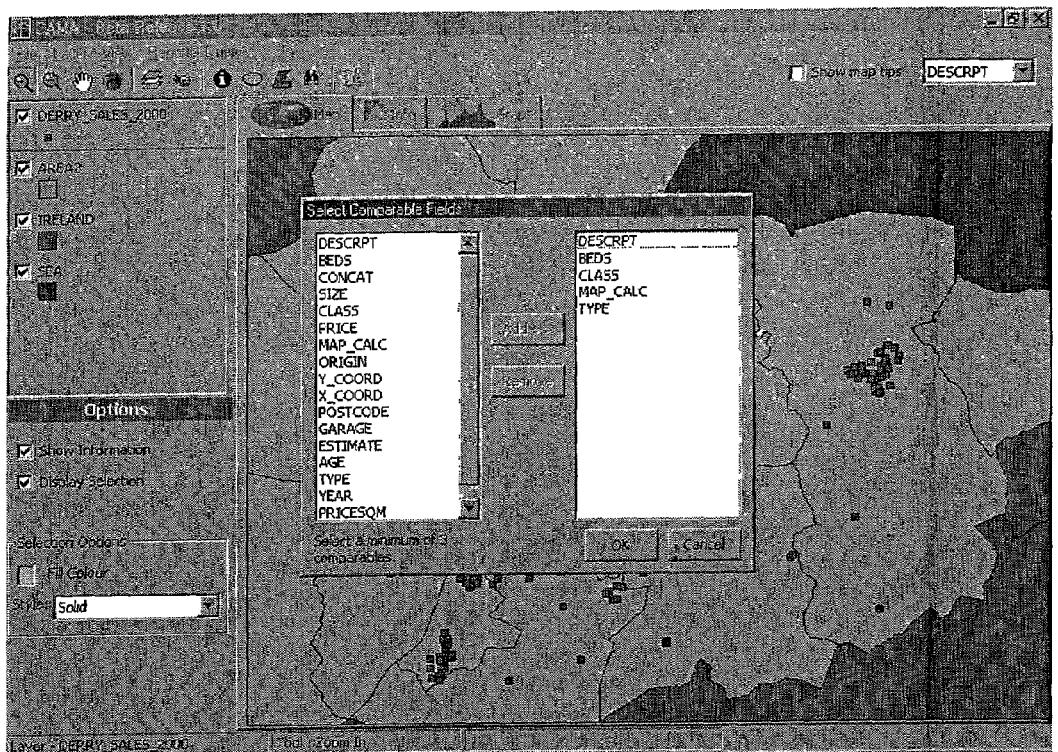

Suitable property attributes, such as total living area, number of rooms, property type, etc, from the dataset are chosen for comparable fields or variables at step 34 to generate the index of similarity matrix. The fields for step 34 are illustrated in FIG. 9, where a minimum of three variables are used, to improve valuation accuracy. Once the selected variables are confirmed by the user at step 36, the computer program begins the process of creating the index of similarity. Each variable is first examined at step 38 to determine whether or not it is numeric; where non-numeric variables are found, they are automatically recoded at step 40 to assign numeric equivalents. For example, house types of TER, SDT, or DT may be recoded as 1, 2, 3 respectively. When all variables are numeric, they are then standardised at step 42 to allow comparison of variables which may be over widely differing ranges; for example, while number of bedrooms may vary from 1 to 6, price may vary from $10,000 to $100,000 within a dataset; standardisation recalculates all variables to lie on a standard scale.

Once the variables have been standardised, an index of similarity is calculated at step 44 using the selected property attributes to compare each property with every other property resulting in a variable correlation coefficient. Standard statistical techniques may be used to calculate the correlation coefficient; for example, the Pearson product moment correlation coefficient. The index of similarity is then normalised at step 46 to represent every correlation coefficient as a number between 0 and 1, after which the normalised variables are recorded in a matrix at step 48. An extract of a sample matrix is illustrated in FIG. 10, which shows an extract of a matrix including correlation coefficients between a number of properties. The extract illustrated here only shows a small portion of a much larger matrix. A coefficient of 0 indicates that two properties are completely uncorrelated, while a coefficient of 1 indicates that the two properties are perfectly correlated. The generated matrix is returned to the main flow of FIG. 1 at step 50.

Returning now to FIG. 1, the subset of properties used to calculate property values may be further restricted once the index of similarity matrix has been generated by selecting only properties within a restricted area at step 22, and/or by selecting only properties of a certain type at step 24. These allow selection of a subset of properties by spatial and non-spatial characteristics. In certain embodiments of the invention, these selection steps may be performed prior to calculating the index of similarity matrix, or for example when importing the property dataset, to reduce the number of unwanted calculations to be performed.

Figure 3:
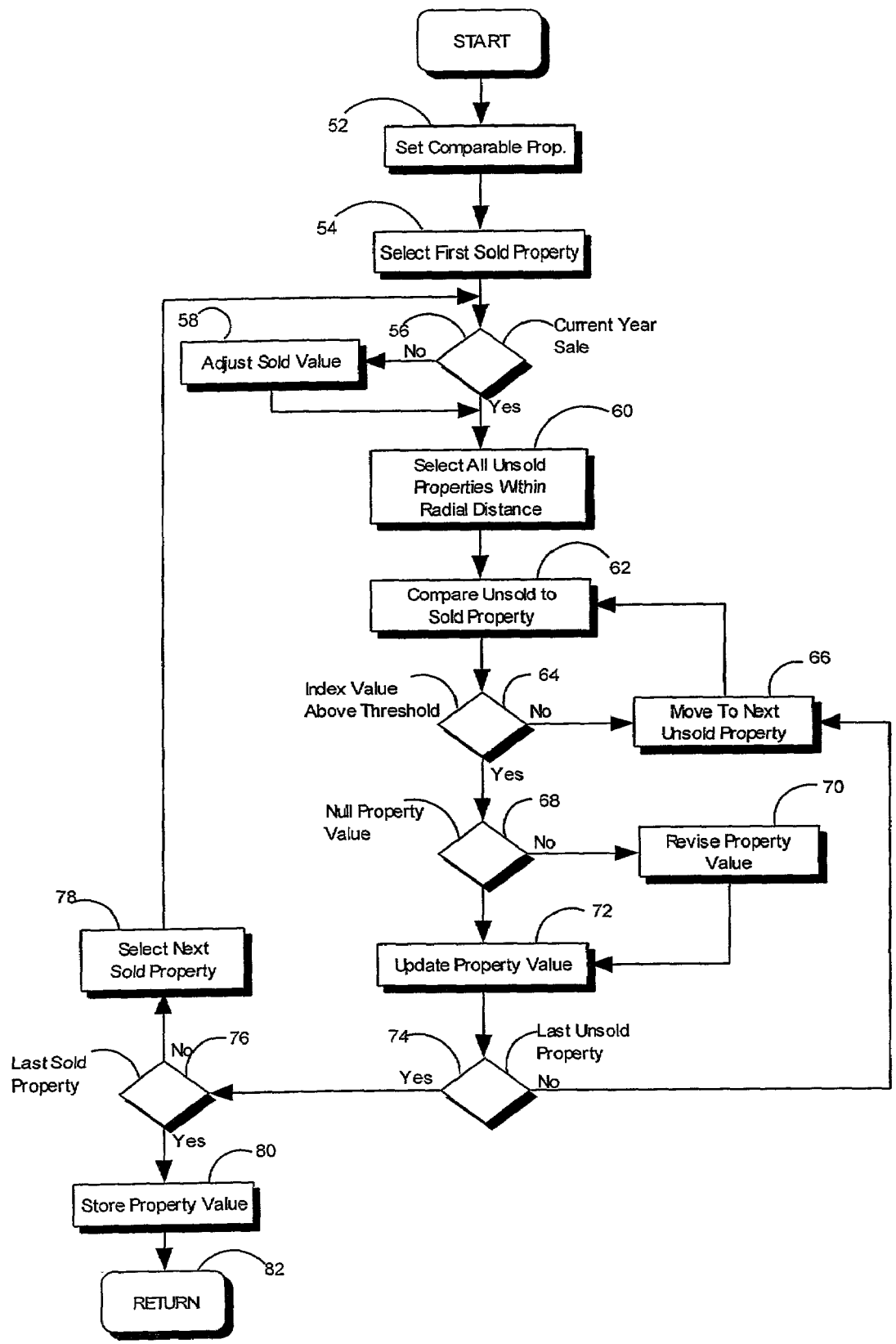
FIG. 3 is a flow chart describing the steps involved in generating the estimated value of unsold properties using spatially-proximate comparable properties.

The next step 26 is to calculate valuations for the subject properties within the dataset. This process is illustrated in FIG. 3, and will now be described before returning to the remainder of FIG. 1.

Figure 11:
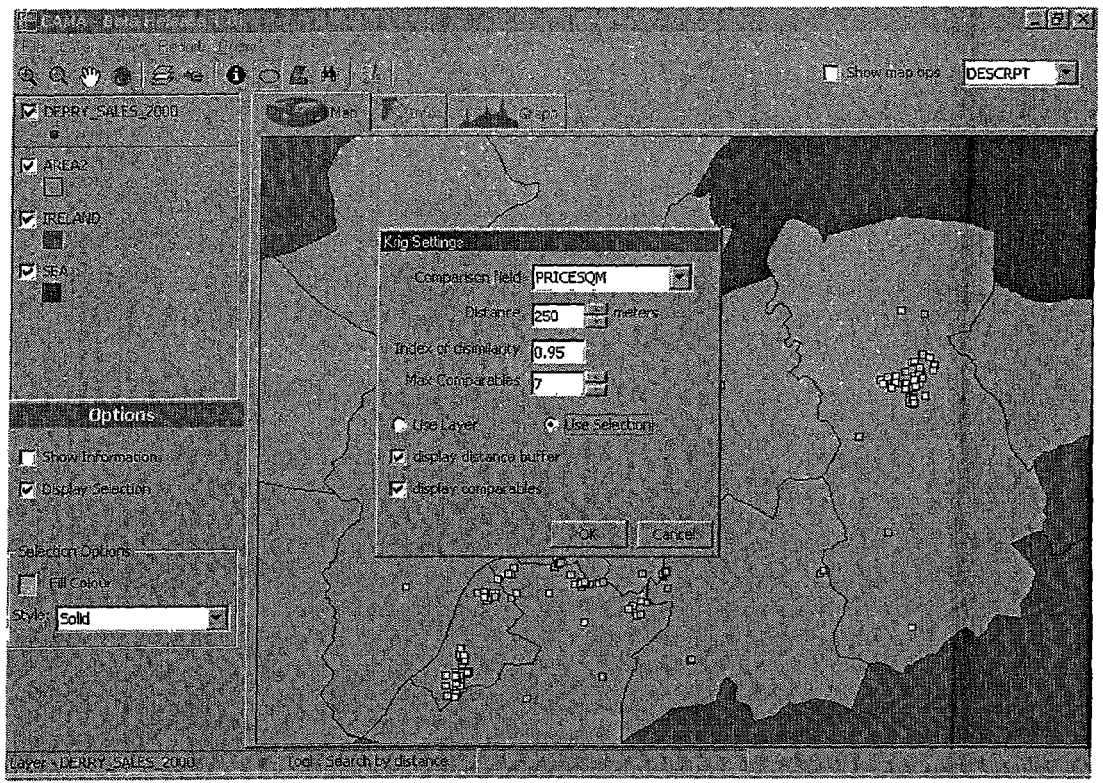

The initial step 52 is to set comparable properties; that is, determine the thresholds within which two properties are identified as being comparable. Comparable properties are set by firstly specifying a distance factor or threshold outside of which properties will be assumed not to influence valuations. An index of similarity threshold is also set in this step 52, that is, a correlation coefficient which must be met for a property to be considered comparable to a subject property. This is illustrated in FIG. 11, which also indicates that a user may set a maximum number of comparable properties to use for each subject property, and whether price per square meter or price per property is to be used as the basis for the valuation. Rather than directly setting the index of similarity threshold, the user may set an index of dissimilarity threshold; this is simply the converse of the index of similarity threshold, and does not affect the working of the technique in any substantial manner. These thresholds may be set by the user, or suggested thresholds may be calculated by the computer program on the basis of the contents of the dataset, using semi-variogram analysis, or Kriging interpolation. As can be seen in FIG. 11, the thresholds set in this step 52 will be used as settings for subsequent steps of the process.

Once these thresholds have been set, the first sold property is selected from the dataset (step 54). If the sale of the property was not completed in the current year, step 56, the sale value is adjusted at step 58 to reflect current year sales, and to take property price fluctuations into account. All unsold (subject) properties within the distance factor from the sold property are selected at step 60. Each unsold property in the selection is compared to the sold property at step 62. Here the index of similarity is used to compare the sold and unsold properties. If the correlation coefficient returned, step 64, is greater than the index of similarity threshold set in step 52, then the value of the sold property will be used by the computer program to calculate the estimated value for the unsold property. If the correlation coefficient is below the threshold, the program continues to the next unsold property at step 66, and is returned to step 62. The estimated property value is calculated using an aggregation (mean) value returned at step 64 of suitable comparable properties. If the estimated value at step 68 is currently null, then the estimated value will be updated at step 72, otherwise the estimated value will be revised at step 70. This process will continue until there are no more unsold properties in the selection. At this stage the system will return to step 62 unless there are no more unsold properties in the dataset. The system then checks to determine whether any more sold properties remain to be examined, at step 76. If sold properties remain, the system selects the next sold property within the dataset at step 78, and returns to step 56. If no more sold properties remain, the system proceeds to step 80. The new estimated values are written to the dataset at step 80 along with details of the comparable sold properties used to determine the estimated value. The results are then returned to the flowchart of FIG. 1 at step 82.

Figure 12:
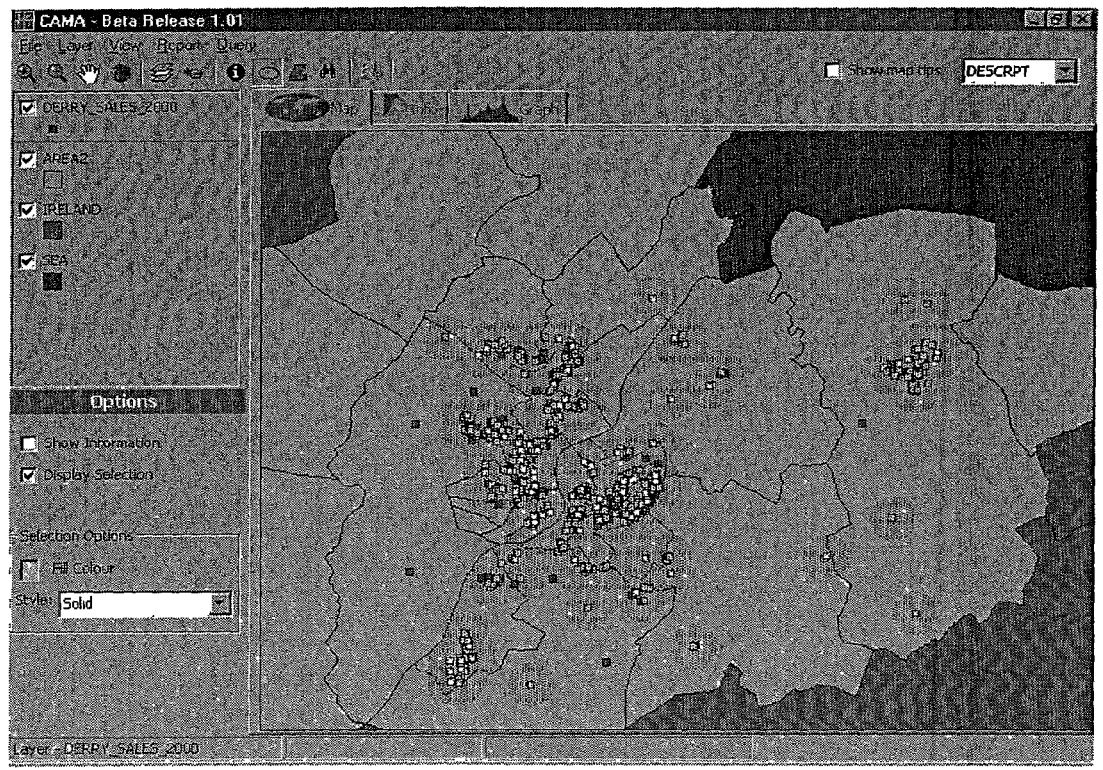

The graphical output from this process is illustrated in FIG. 12, which indicates each sold property and the distance factor around the property within which unsold properties will be considered to be spatially proximate.

Figure 13:
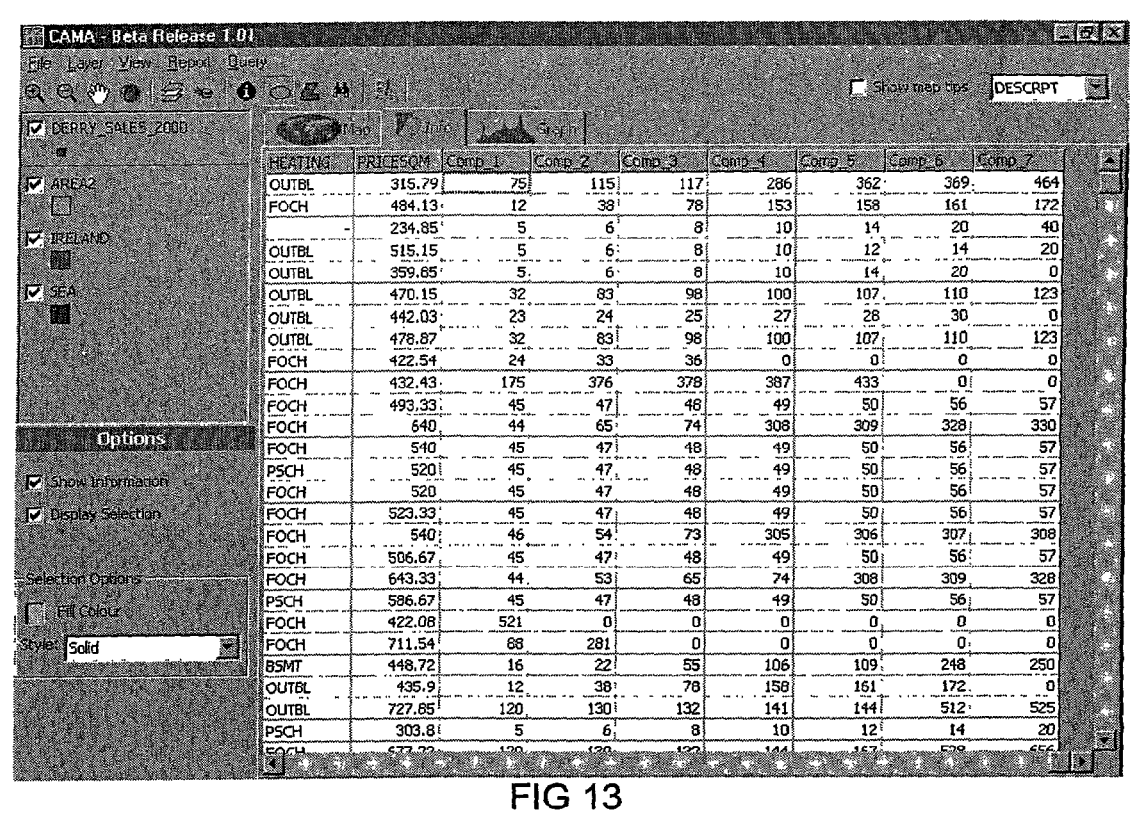

Returning now to FIG. 1, once the results of the calculation are returned to the main program at step 82 (of FIG. 3), the results may be viewed at step 28 or exported in various formats. Sample results are given in FIG. 13, showing estimated property prices per square meter, and an identifying number of each comparable property used to calculate the value. These comparable properties may then be inspected on the database if desired. If the results do not appear reliable, the system can return to step 16 where outliers may be removed, the criteria redefined, and the matrix etc generated again. Otherwise the system will go to step 32 where the results are stored for future analysis.

Figure 4:
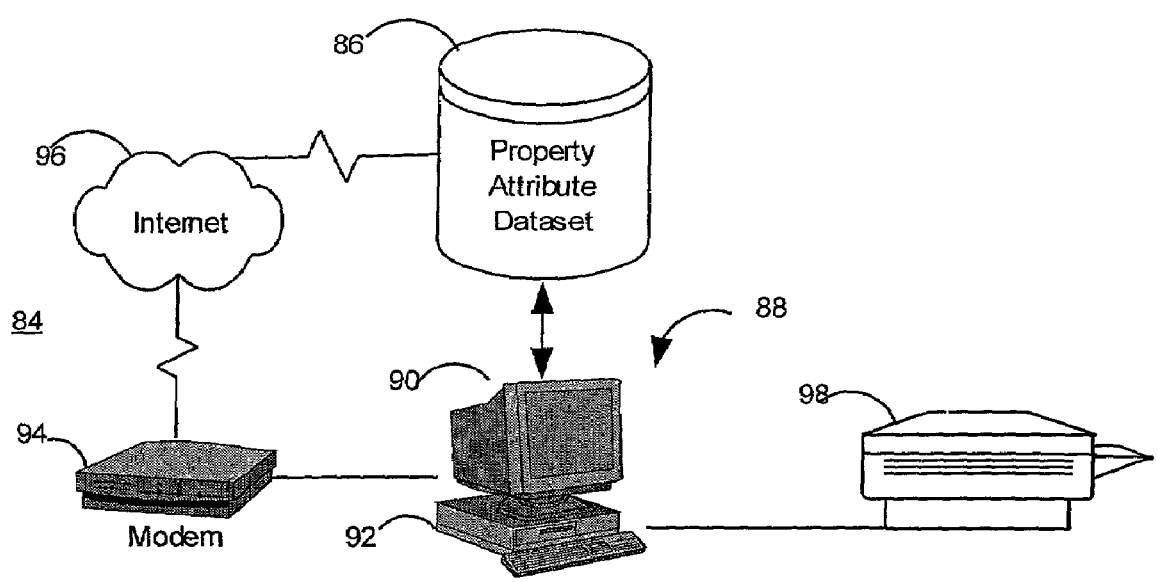
FIG. 4 is an illustration of a computer system used to estimate values of subject properties.

FIG. 4 shows a computer system 84 which is used to implement the method described. A personal computer 92 is connected to a monitor 90 for displaying the results and steps of the calculation, and to a modem 94 for accessing, via the internet 96, a property dataset 86 stored at a remote location. The computer 92 is also connected to a printer 98 for providing a hard copy of the valuation results.

The system may be used in various ways. A property assessor may use the computer 92 to provide customers with reports on their own property values by using a local property database (which may be accessed via the internet). Alternatively, the assessor may use a database from a different area to provide information on property values in another part of the country, or even overseas. The hard copy of the report may include information not only on the property valuation, but also details of the relevant properties used to generate the valuation. When using the internet to access the database, the system may also retrieve additional information regarding a particular area from alternative sources on the internet; for example, local amenities, local taxation rates, and so forth, and provide these to the customer together with a property valuation.

An alternative means of using the system 84 is for an individual to use their own home computer to access a remote database (or a remote computer which is running a program to implement the present method) via the internet to obtain a valuation of their own or another property without the intermediary of a property assessor. The entity operating the remote database may charge for this service, for example by debiting an agreed amount to an individual's credit or debit card. Alternatively, the individual may access a remote computer via a mobile telephone or similar device, and have a valuation returned to the telephone by SMS (short message service), or via a WAP-enabled connection. The charge in this case may be incorporated into the cost of the connecting telephone call, or may be via credit card or the like. A further variation may be to charge a low rate for a straightforward valuation, or to charge a higher rate for a more substantial valuation which would be recognised by banks and others for lending purposes.

It will be understood that other variations on the method and computer system described herein may be made, while still remaining within the scope of the invention. For example, although reference has been made herein primarily to residential property, the method can of course be used for valuation of commercial property, or even land, given that the values of these varies dependent on location.

What we claim is:

1. A computer-implemented method of spatially-based valuation of a subject property, the method comprising the steps of:
   selecting a subset of properties for comparison from a computer database containing characteristics of a plurality of properties of known value, the characteristics including at least a location and a value of each property, and the database further containing characteristics of a subject property of known location;
   generating an index of similarity matrix of the subset of properties;
   identifying spatially proximate comparable properties to the subject property, by means of a distance factor and an index of similarity threshold;
   calculating the value of the subject property based on the values of the identified spatially proximate comparable properties; and
   calculating optimal values for either or both of the index of similarity threshold and the distance factor.

2. The method of claim 1, further comprising the step of weighting the calculation of the value of the subject property with regard to the proximity of the comparable properties.

3. The method of claim 1 wherein the step of subset selection includes the step of selecting a particular subject property or properties.

4. The method of claim 1 wherein the calculation of the value of the subject property makes use of an interpolation technique.

5. The method of claim 1, wherein the database includes characteristics of the properties in addition to location and value.

6. The method of claim 1 wherein the step of generating the index of similarity matrix comprises calculating a similarity score for each property when compared with every other property within the subset.

7. The method of claim 1 further comprising the step of selecting characteristics to be compared for generation of the index of similarity matrix.

8. The method of claim 1 further comprising the step of automatically recoding non-numerical characteristics into numerical characteristics.

9. The method of claim 1 wherein the step of generation of the index of similarity matrix further comprises the step of standardising characteristics to be compared, such that each characteristic may be meaningfully compared with each other characteristic.

10. The method of claim 1 further comprising the step of normalising the calculated index of similarity matrix, to provide a similarity score of between 0 and 1 for each property.

11. The method of claim 1 further comprising the step of displaying the location of properties on a display.

12. The method of claim 11 further comprising the step of displaying a map of a relevant area.

13. The method of claim 1 further comprising the step of reporting the calculated value of the subject property to an operator.

14. The method of claim 1 further comprising the step of reporting to an operator additional details of the calculation.

15. The method of claim 1 further comprising the step of calculating a reliability rating for a calculated value of a subject property.

16. The method of claim 1 further comprising the step of removing properties with statistically outlying characteristics from the subset of properties.

17. A computer program product for spatially-based valuation of a subject property comprising computer program code recorded on a data carrier being executed by a computer, the computer program code comprising:
   code for allowing the selection of a subset of properties for comparison from a computer database containing characteristics of a plurality of properties of known value, the characteristics including at least a location and a value of each property, and the database further containing characteristics of a subject property of known location;
   code for generating an index of similarity matrix of the subset of properties;
   code for identifying spatially proximate comparable properties to the subject property, by means of a distance factor and an index of similarity threshold; and
   code for calculating the value of the subject property based on the values of the identified spatially proximate comparable properties.

18. A computer program for spatially-based valuation of a subject property being embodied in a computer-readable medium executed by a computer, the computer program comprising:
   code for allowing the selection of a subset of properties for comparison from a computer database containing characteristics of a plurality of properties of known value, the characteristics including at least a location and a value of each property, and the database further containing characteristics of a subject property of known location;
   code for generating an index of similarity matrix of the subset of properties;
   code for identifying spatially proximate comparable properties to the subject property, by means of a distance factor and an index of similarity threshold; and
   code for calculating the value of the subject property based an the values of the identified spatially proximate comparable properties.

19. A computer system for spatially-based valuation of a subject property, the system comprising:
   means for selecting a subset or properties for comparison from a computer database containing characteristics of a plurality of properties of known value, the characteristics including at least a location and a value of each property, and the database further containing characteristics of a subject property of known location;
   means for generating an index of similarity matrix of the subset of properties;
   means for identifying spatially proximate comparable properties to the subject property, by means of a distance factor and an index of similarity threshold; and
   means for calculating the value of the subject property based on the values of the identified spatially proximate comparable properties.

20. The system of claim 19 further comprising means for remotely accessing said computer database.

21. The system of claim 19 further comprising means for generating a report of the value of the subject property to a user.

22. A method of spatially-based valuation of a subject property, the method comprising the steps of:
   selecting a subset of properties for comparison from a database containing characteristics of a plurality of properties of known value, the characteristics including at least a location and a value of each property, and the database further containing characteristics of a subject property of known location;
   generating an index of similarity matrix of the subset of properties;
   identifying spatially proximate comparable properties to the subject property, by means of a distance factor and an index of similarity threshold; and
   calculating the value of the subject property based on the values of the identified spatially proximate comparable properties.

23. A method of providing a spatially-based property valuation to a customer, the method comprising the steps of:
   selecting a subset or properties for comparison from a computer database containing characteristics of a plurality of properties or known value, the characteristics including at least a location and a value of each property, and the database further containing characteristics of a subject property of known location;
   generating an index of similarity matrix of the subset of properties;
   identifying spatially proximate comparable properties to the subject property, by means of a distance factor and an index of similarity threshold;
   calculating the value of the subject property based on the values of the identified spatially proximate comparable properties;
   providing a report containing the calculated value of the subject property to a customer; and
   charging the customer in return for providing the report.

24. The method of claim 23 further comprising the step of allowing the customer to select a desired level of detail of the report, and charging the customer dependent on their selected level of detail.

25. A method of providing a spatially-based valuation of a subject property, the method comprising the steps of:
- accessing a remote computer database containing characteristics of a plurality of properties of known value, the characteristics including at least a location and a value of each property, and the database further containing characteristics of a subject property of known location;
- selecting a subset of properties for comparison from the database;
- generating an index of similarity matrix of the subset of properties;
- identifying spatially proximate comparable properties to the subject property, by means of a distance factor and an index of similarity threshold; and
- calculating the value of the subject property based on the values of the identified spatially proximate comparable properties.

26. A method of providing a spatially-based valuation of a subject property, the method comprising the steps of:
- allowing a user to select a subset of properties for comparison from a remote computer database containing characteristics of a plurality of properties of known value, the characteristics including at least a location and a value of each property, and the database further containing characteristics of a subject property of known location;
- generating an index of similarity matrix of the subset of properties;
- identifying spatially proximate comparable properties to the subject property, by means of a distance factor and an index of similarity threshold;
- calculating the value of the subject property based on the values of the identified spatially proximate comparable properties; and
- providing the calculated value to the user.

* * * * *